E. M. CRANDAL.
FIRE-EXTINGUISHER AND WINDOW-WASHER.

No. 175,039. Patented March 21, 1876.

Witnesses:
L. L. Coburn
L. A. Bemling

Inventor:
Edward M. Crandal

UNITED STATES PATENT OFFICE.

EDWARD M. CRANDAL, OF CHICAGO, ILLINOIS, ASSIGNOR OF ONE-HALF HIS RIGHT TO ALFRED B. McCHESNEY, OF SAME PLACE.

IMPROVEMENT IN FIRE-EXTINGUISHERS AND WINDOW-WASHERS.

Specification forming part of Letters Patent No. 175,039, dated March 21, 1876; application filed October 16, 1875.

*To all whom it may concern:*

Be it known that I, EDWARD M. CRANDAL, of Chicago, in the county of Cook and State of Illinois, have invented an Improvement for a Fire-Extinguisher and Window-Washer, of which the following is a specification, reference being had to the accompanying drawings, which form a part hereof.

The object of my invention is to make a light, cheap, and portable apparatus which will hold a quantity of water, and by which the water can be forced in jets from a nozzle or tube to wash windows and other like purposes, where it is desired to throw a stream or spray of water.

The nature of my invention consists of the mechanism hereinafter fully described and shown.

Figure 1:
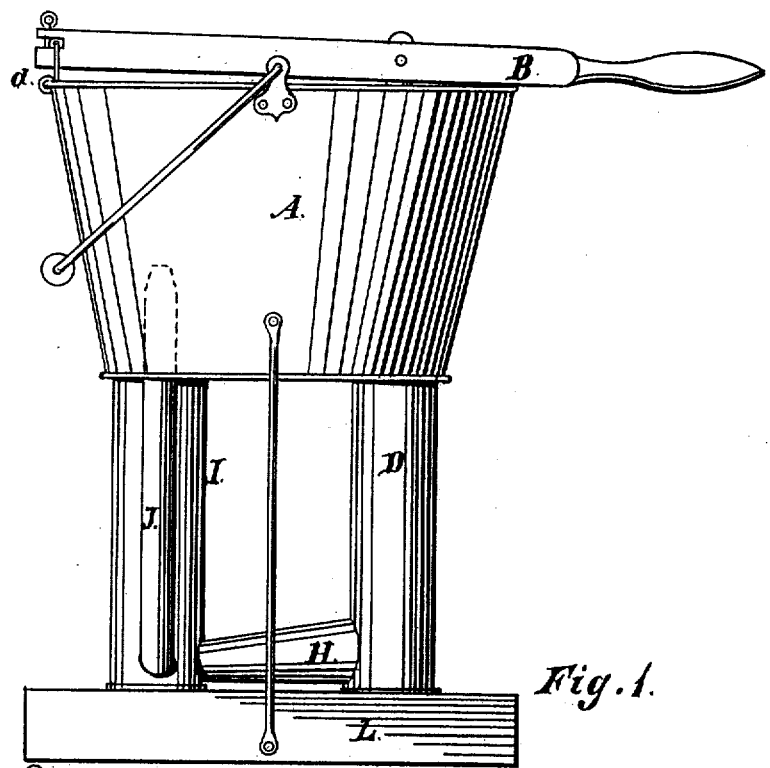
Figure 2:
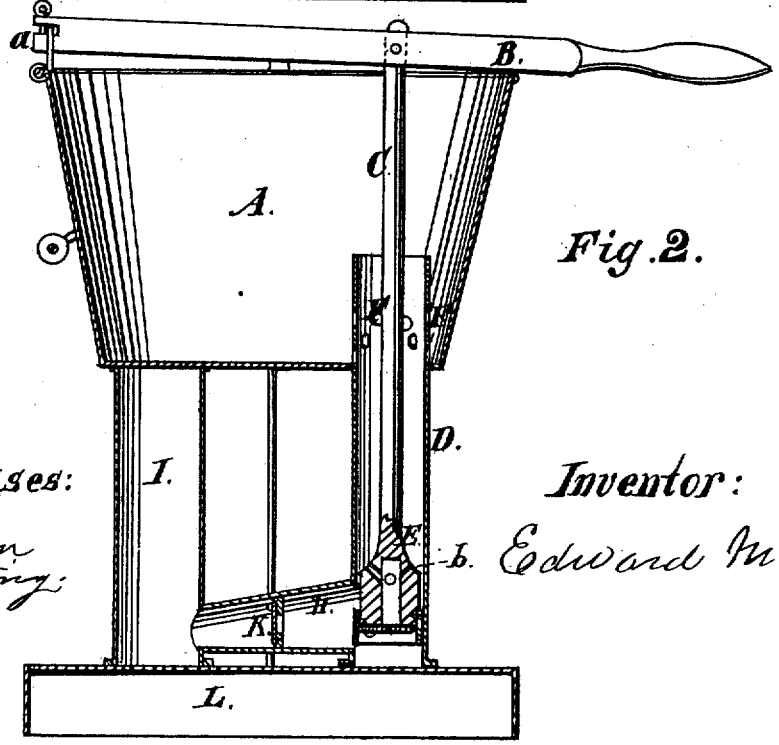

In the accompanying drawings, Figure 1 represents a side view of my apparatus. Fig. 2 represents a central vertical sectional view.

A is a tank or vessel for holding water. I ordinarily use one of sufficient size to hold from twelve to twenty quarts. B is a lever, pivoted at a on one side of this vessel, and also to the pump-piston C. D is a tube extending through the bottom of the vessel A, and in which the valve E fits. F are holes in this tube D to admit water from the vessel, and it is also open at its upper end to receive water. The valve E opens downward, and when the piston C is raised, it opens and allows the water to flow through the apertures b and the valve E, but on a downward stroke the valve closes, forcing the water below it out through the pipe H. I is an air-chamber, having an outlet pipe, J, near its bottom, to which the tube or nozzle for throwing the water is attached. K is a valve, which opens to allow the water to flow through the pipe H toward the air-chamber I, but closes to prevent its flowing back to the tube D. The air chamber I is partly filled with water, which is forced through the pipe H, and the pressure of the atmosphere compressed in said air-chamber causes a constant stream of water to be thrown from the outlet-pipe J. L is the base of the apparatus, made sufficiently broad to support it in a vertical position when it is being operated.

This is a cheap portable apparatus, and is very useful for throwing and sprinkling water for many purposes.

It will be observed that by having an opening down through the pump valve or piston E, and placing it in a cylinder below the reservoir, the water flows through the piston into the cylinder, from whence it is forced as above described.

I claim—

1. The combination of the vessel A, the tube D, extending below the vessel and opening into its bottom, the pump-piston C, constructed substantially as described, and the valve K, as specified and shown.

2. The combination of the air-chamber I, pump-cylinder D, arranged below and supporting the vessel A, and connected by the tube H, provided with a valve, as specified.

EDWARD M. CRANDAL.

Witnesses:
HEINRICH F. BRUNS,
L. A. BUNTING.